United States Patent Office 3,478,824
Patented Nov. 18, 1969

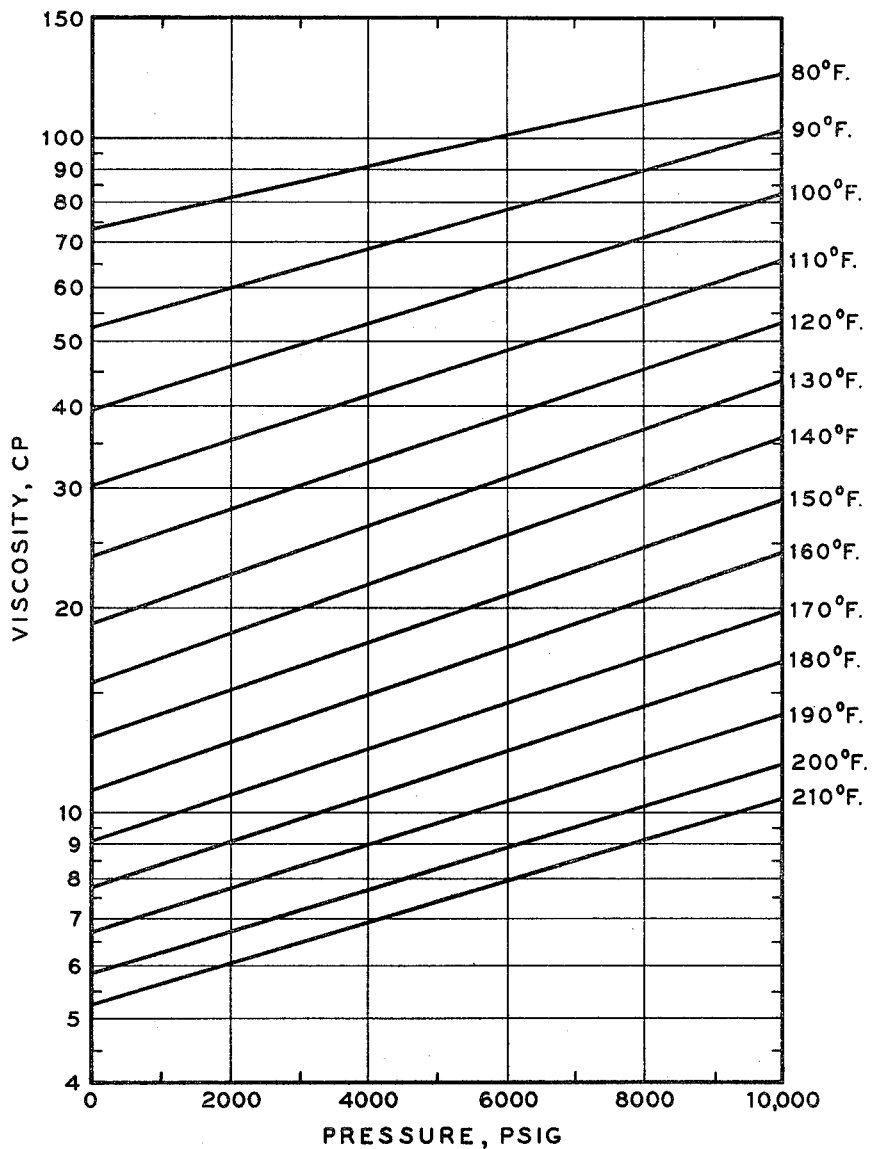

3,478,824
SAND CONSOLIDATION PROCESS
Patrick H. Hess, Diamond Bar, and Ralph S. Millhone, Brea, Calif., assignors to Chevron Research Company, San Francisco, Calif., a corporation of Delaware
Filed Apr. 12, 1968, Ser. No. 720,976
Int. Cl. E21b 33/138
U.S. Cl. 166—295                                   6 Claims

ABSTRACT OF THE DISCLOSURE

A method for consolidating an unconsolidated earth formation penetrated by a well with an epoxy resin compound or mixture of epoxy compounds suitable over a wide range of temperatures and a permeability flush fluid which gives an optimum combination of strength and permeability retention. The permeability flush fluid comprises a hydrocarbon oil containing a hydrocarbon oil-miscible compound. Immediately following the permeability flush fluid, a dilute solution of a curing agent is injected into the formation to harden the resin. The resin may be blended with a predominantly aromatic hydrocarbon liquid and an epoxy silane prior to injection into the formation.

---

This invention relates to a method of consolidating an incompetent earth formation which includes loose or unconsolidated sand or earth particles penetrated by a well to prevent the invasion of sand or earth particles into the well during fluid production from the formation. More specifically, this invention is concerned with a sand consolidation method utilizing a low viscosity fluid mixture which includes a polymerizable material of the epoxy resin type, which mixture is useable at a wide range of temperatures, and a permeability flush fluid useful to improve the permeability retention of the resulting consolidated formation while maintaining high consolidation strength.

Heretofore, a number of methods have been used to consolidate unconsolidated earth formations penetrated by a well. Different methods of sand consolidation are described, for example, in U.S. Patents 3,176,767; 3,176,768 and 3,176,769. In prior sand consolidation methods, and especially with resins of the epoxy type, different resin compositions were used depending on the temperature in the formation which was to be consolidated. Thus as many as three resin systems were heretofore used to cover temperatures of from 60 to 250° F. There is need, therefore, for one sand consolidation process which utilizes a low viscosity material of the epoxy resin type, and which gives adequate strength and acceptable permability to the consolidated formation under a wide range of conditions and temperatures. Thus there is need for a universal resin system for use in consolidating formations over a wide range of temperatures such as, for example, 60° to 250° F. The resin system should also be such that storage over a long period of time is possible. The resin system also must produce a consolidated sand having a high degree of permeability retention and long term durability when subjected to well fluids.

Briefly, the preferred embodiment of the present invention provides such a resin system for use in a method of consolidating loose or unconsolidated earth formations penetrated by a well. This is accomplished by injecting, in sequence, into the formation one volume of a mixture of (a) 100 parts by weight of an epoxy compound or mixture of epoxy compounds having the formula

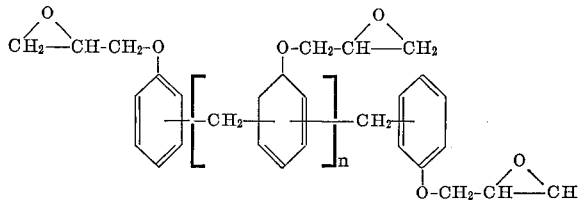

in which $n$ is an integer from 0 to 5, (b) from 10 to 100 parts by weight of a predominantly aromatic hydrocarbon liquid, and (c) from 0.5 to 5 parts by weight of a glycidyl oxyalkyl trialkoxysilane; at least one-third volume of hydrocarbon oil containing from 2.5% to 15% by volume of a hydrocarbon oil miscible compound useful to impart optimum permeability to the consolidated formation; and a quantity of a resin curing agent for the epoxy compound or mixture of epoxy compounds sufficient to cause hardening of a major part of the epoxy compound or mixture of epoxy compounds injected into the formation.

An object of the present invention is to provide a method of consolidating unconsolidated particles in a well utilizing an epoxy resin suitable over a wide temperature range and a permeability flush to impart optimum permeability and consolidation strength to the consolidated formation.

Further objects and advantages of the present invention will become apparent from the following detailed description read in light of the accompanying drawing which is a part of this specification and illustrates typical viscosity of the present resin under various conditions of pressure and temperature.

In a preferred aspect the present invention provides for injecting into a formation having a sand or incompetent earth control problem a mixture of 100 parts by weight of an epoxy compound, from 10 to 100 parts by weight of a predominantly aromatic hydrocarbon liquid and from 0.5 to 5 parts by weight of a glycidyl oxyalkyl trialkoxysilane. The epoxy resins useful in this invention are the novolac resins and have the general formula

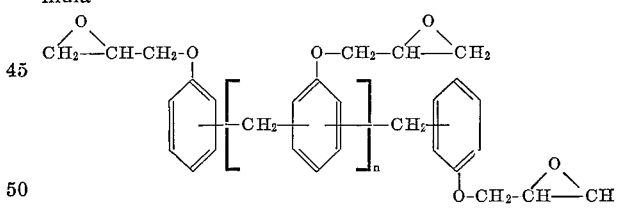

in which $n$ is an integer from 0 to 5.

The novolac resins are well-known substances, and many are available commercially. Their preparation is described in the literature, such as in the book Phenoplasts, 1947, page 29 et seq., by T. S. Carswell. In general, these resins are prepared by condensing phenol with an aldehyle in the presence of an acid catalyst. Proportions of phenol and aldehyde in mol ratios of phenol to aldehyde greater than 1.1 and up to 2.5 are taught. Formaldehyde is the preferred aldehyde, although the use of other aldehydes, such as acetaldehyde, chloral, butyraldehyde and furfural is permissible.

Similarly known is the condensation reaction of epichlorohydrin with the novolac resin. The reaction is effected at a temperature in the range 140° F. to 300° F. between the novolac resin and at least about 3 moles of epichlorohydrin for each phenolic hydroxyl equivalent of the novolac resin, in the presence of about 1 mol of alkali metal hydroxide per phenolic hydroxyl equivalent of novolac resin. When the reaction is complete, the epoxy resin is isolated from the reaction mixture by removal of alkali metal salt, of unreacted alkali, epichlorohydrin and water, and purified.

As above indicated, epoxy resins of the type herein contemplated are available commercially. For example, suitable material available commercially where the integer $n$ is equal to 1.3 is Dow Epoxy Novolac 438. Thus a preferred resin for use is represented by the formula

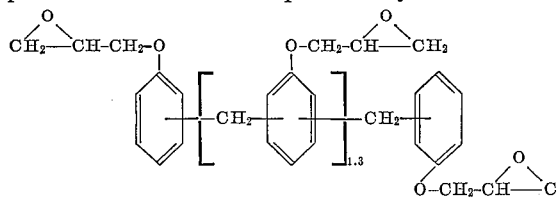

Another suitable material available commercially is Dow Epoxy Novolac 431 where $n$ is equal to 0.2. A predominantly aromatic hydrocarbon liquid is used to dilute the above epoxy compound so that a low viscosity mixture results. The hydrocarbon liquid is added in an amount of from 10 to 100 parts by weight for each 100 parts by weight of the epoxy compound. Suitable aromatic hydrocarbon liquids for this purpose include toluene, benzene, xylene, ethylbenzene, cumene and mixture aromatics of chrysamine-naphthene-phenanthrene type. Toluene is preferred for use in the present invention. From 0.5 to 5 parts by weight of silane may be added to the mixture to improve the strength of the resulting consolidation.

The highly preferred mixture for use as a universal resin in the present invention comprises 100 parts by weight of an epoxy compound having the above formula in which $n$ is an integer equal to 1.3; 50 parts by weight of toluene; and one part by weight of a glycidyl oxyalkyl trialkoxysilane. The viscosity of this mixture at various temperatures and pressures is illustrated graphically in FIGURE 1. As there indicated the viscosity of the universal resin remains within an effective range at temperatures between 80 and 210° F. at all pressures likely to be encountered. Further, the universal resin is useable over a range of from 60° F. up to temperatures of 250° F.

The universal resin of the present invention is, therefore, a blend of epoxy novolac resin, epoxy silane and a hydrocarbon liquid, preferably toluene. It is preferred to first mix part of the toluene and all of the silane in a suitable mixing vessel. For example, when forming the preferred resin in accordance with the invention, i.e.: 100 parts by weight of epoxy resin of the above formula; 50 parts toluene; and 1 part epoxy silane; about 90% of the toluene should first be placed in a clean mixing vessel. All of the silane is then added and the mixture stirred rapidly for 5 to 10 minutes. Following this, the epoxy resin is then added with continued rapid stirring. The remainder of the toluene is added and blending is continued. The now formed universal resin of the present invention is suitably blended when the viscosity of portions of the blend from the top and bottom of the mixing vessel agree within 2%. The universal resin may then be placed in sealed drums for storage until used. Typical viscosity properties of the resin under various conditions of pressure and temperature are illustrated in the drawing.

In accordance with the invention one volume of resin is injected into an unconsolidated formation and is followed by at least one-third volume of a hydrocarbon oil containing from 2.5% to 15% by volume of a hydrocarbon oil miscible compound. This compound is preferably selected from the group consisting of lower alkanols and lower aliphatic ketones. This mixture is useful as a flushing fluid to displace excess resin from the formation matrix interstices and establish optimum permeability in the consolidated zone.

The miscible compound which is added to the oil flush serves to remarkably increase the final permeability retention in the consolidated interval above that obtained with oil alone as a flush fluid. This feature of the present invention is shown in Table I.

TABLE I.—EFFECT OF PERMEABILITY FLUSH ADDITIVES ON PERMEABILITY RETENTION

| Sample Preparation Temp., ° F. | Permeability Flush | | No. Samples Prepared | Average Sample Properties | | |
|---|---|---|---|---|---|---|
| | Compound Added | Vol., Percent | | Initial Permeability, md. | Permeability Retained, Percent | Initial Compressive Strength, p.s.i. |
| 100 | None, Control | | 5 | 2,710 | 14 | 4,610 |
| | 2-propanol | 5 | 3 | 2,920 | 39 | 6,420 |
| | do | 10 | 2 | 2,380 | 55 | 7,360 |
| | Acetone | 10 | 1 | 2,290 | 57 | 5,430 |
| | Toluene | 10 | 2 | 2,140 | 22 | 5,590 |
| 150 | None, Control | | 2 | 2,800 | 30 | 3,920 |
| | 2-propanol | 5 | 2 | 2,540 | 62 | 5,960 |
| | do | 10 | 3 | 2,830 | 54 | 1,550 |
| 200 | None, Control | | 2 | 1,960 | 19 | 2,560 |
| | 2-propanol | 5 | 4 | 3,010 | 55 | 4,700 |
| | do | 10 | 2 | 2,600 | 63 | 1,780 |
| | Acetone | 10 | 1 | 2,380 | 54 | 2,310 |
| | Toluene | 10 | 2 | 2,760 | 31 | 1,750 |

It is highly preferred to add 2-propanol to the hydrocarbon oil, which is preferably diesel oil for use as a flush fluid. The alcohol is used in an amount of between 2.5% and 15% by volume. About 5% by volume of alcohol is preferred. The addition of the 2-propanol to the diesel oil flush fluid increases final permeability retention of the consolidated sand. Thus, diesel oil containing 5% 2-propanol by volume improves the permeability retention about 150–200% over a straight diesel flush.

After the permeability flush fluid as described above has been injected into the formation, a quantity of a resin curing agent for the epoxy compound sufficient to cause hardening of a major part of the epoxy compound is injected into the formation and contacted with the resin. A number of curing agents or activators or catalysts will harden the unset resin. These include amines, dibasic acids, and acid anhydrides. In accordance with the present invention, the preferred class of hardeners or curing agents are the amines, including primary, secondary, or tertiary amines and mixtures thereof. Examples are primary aliphatic amines, such as diethylenetriamine, ethylenediamine, triethylenetetramine, 3-dimethylaminopropylamines, such as piperidine, menthane diamine; tertiary amines, such as piperidine, methane diamine; tertiary amines, aliphatic or aromatic substituted derivatives, such as triethylamine, benzyldimethylamine, dimethylaminomethylphenol, tridimethylaminomethylphenol, and α-methylbenzyldimethylamine; aromatic amines, such as metaxylylene diamine, 4,4'-methylene dianiline, and pyridine.

As indicated, a mixture of the various amines is preferred. A mixture of primary and tertiary amines is even more preferred. This can be a physical mixture of two or more compounds, such as benzyldimethylamine and diethylenetriamine; or a single compound containing both primary and tertiary amine groups, as represented by 3-dimethylaminopropylamine. The most desirable curing agent for use in the present invention is 3-dimethylaminopropylamine (DMAPA), used in diesel oil. It is preferred to use about 5% by volume of DMAPA in the diesel oil. It is also contemplated that DMAPA may be added to the flush fluid if desired, since there is some time lag between contact of resin and DMAPA and hardening of the resin. Thus the curing step may be partially combined with the flushing step by adding DMAPA to the diesel oil and 2-propanol.

In a preferred form the sand consolidation method of the present invention is practiced in an unconsolidated formation in conjunction with a cleanup process. To obtain best results, a series of formation cleanup steps is practiced prior to the time the resin is injected into the formation. Briefly, the sequence of steps involved in formation cleanup includes, first, an injection of diesel oil preflush. The diesel oil preflush should be at least one pore volume of the zone to be treated. About three times the resin volume of a water scavenger is then injected to remove residual water from the formation. A suitable water scavenger is 2-propanol or acetone. A second and usually smaller diesel flush may then be used to move the 2-propanol and water out of the consolidation zone and away from the well. This second injection of diesel oil concludes the formation cleanup and the consolidation method of the present invention is accomplished by injecting a suitable amount of the resin prepared in accordance with the invention. The injeciton of resin is followed by a permeability flush as described above and an activator solution.

The effectiveness of the method was borne out by the following demonstrations. Samples were tested in a Hassler cell. This cell comprises a rubber tube containing sand to be consolidated, adapted to be fitted with end plugs. The end plugs have screened inflow and outflow openings to prevent loss of sand from the rubber tube under pressure and to permit flow of fluids through sand packed in the rubber tube. The plugs are adapted to be hermetically fastened to a metal sleeve which surrounds the rubber tube. The sleeve and rubber tube are sized to hold a sand sample 5 feet long by one inch in diameter. The sleeve provides a means for exerting pressure on the rubber tube and, therefore, on the sand pack (analogous to the pressure on an incompetent formation from the earth above, known as overburden pressure). Additional equipment includes a pressure tank for storage of fluids prior to their injection into the sand pack, a pump to force fluid through the sand pack; a bath for heating the Hassler cell; and means, such as a graduated cylinder, or flask, to measure the outflow of fluids.

In these demonstrations, Nevada 130 sand, 95% passing a 100 mesh screen and having grains of irregular size and shape, was placed in the rubber tube and compacted by vibrating for 15 minutes. Overburden pressure was held at 2500 p.s.i. at the indicated temperatures to simulate the conditions of a formation penetrated by a well. The sand pack in the tube was brine saturated (25,000 p.p.m. NaCl) and the brine permeability was measured. Diesel oil was flowed through the sand pack. A water scavenger followed, then diesel oil again. The diesel oil is not miscible with the epoxy compound and it is usually preferred to inject such an immiscible hydrocarbon oil into the sand pack in advance of the injection of the epoxy compound. Following the oil saturation step, a resin solution was then injected. In Demonstrations 1–3 this injection was followed by the injection of diesel oil containing from 2.5% to 15% parts by volume of a water-miscible compound selected from the group consisting of lower alkanols and lower aliphatic ketones. In Demonstration 4 the permeability flush step was accomplished using toluene in diesel solution. Demonstration 5 shows a comparison in which no additive is used with the diesel oil in the flushing step. After this permeability flush step, a dilute soltuion of a resin curing agent for the epoxy compound sufficient to cause hardening of a major part of the epoxy compound was injected. After the injection of the last fluid, the openings of the plugs were closed (shut-in) and the treated core was allowed to consolidate. Strength and permeability retention tests were conducted on the consolidated cores.

DEMONSTRATION 1

One hundred parts by weight of epoxylated novolac resin having an average molecular weight of 640, a viscosity of about 50,000 centipoises at 125° F., and an epoxide equivalent of 178 was mixed with 50 parts by weight of toluene and one part by weight of 3-glycidyloxypropyltrimethoxysilane to give a solution with a viscosity of 80 centipoises at 76° F. and 1 atmosphere.

300 cc. of brine was pumped through the sand pack of a 60 inch Hassler cell, maintained at about 76° F. and 2500 p.s.i.g. overburden pressure, to water saturate the sand pack. 300 cc. of diesel oil was then flowed through the sand pack in 17 minutes. 300 cc. of 2-propanol followed the diesel oil to scavenge water from the sand pack. An additional 300 cc. of diesel oil followed the 2-propanol scavenger. Total injection time for these latter two fluids was 34 minutes. The sand pack was then heated to 100° F., the overburden pressure was maintained at 2500 p.s.i.g.

100 cc. of the resin solution above was injected in 34 minutes. This was followed by 300 cc. of a solution of 5 percent 2-propanol in diesel oil which was injected in 17 minutes. Following this permeability flush 400 cc. of activator solution, 5 percent 3-dimethylaminopropylamine in diesel oil, was injected in about 22 minutes. The Hassler cell was shut-in for 4 hours. 1400 cc. of the consolidation fluids that had passed through the sand pack were backflushed through the consolidated sand pack in approximately 1 hour and 20 minutes.

When the core was removed from the cell it was found to be completely and uniformly consolidated with no visible channeling. No evidence of plugging was noted. The consolidated core was cut into 1½ inch lengths, was washed, permeabilities were taken on the individual samples, and some samples were tested for compressive strength. The final average permeability of the consolidated sand was found to be 1140 millidarcies or 39 percent of the original permeability. Average compressive strength based on representative samples was determined to be 6420 p.s.i.g.

DEMONSTRATION 2

In this demonstration substantially the same procedure was followed as in Demonstration 1. The temperature of the sand pack during consolidation was 200° F. Average permeability of the sand pack after consolidation was found to be 1660 millidarcies or 55 percent of the original permeability. Average compressive strength based on representative samples was determined to be 2700 p.s.i.g.

DEMONSTRATION 3

In this demonstration substantially the same procedure was followed as in Demonstration 1. The permeability flush consisted of 300 cc. of a 10 percent solution of acetone in diesel oil. Final permeability of a consolidated sand pack was 1300 millidarcies or 57 percent of the initial permeability. Average compressive strength based on representative samples was determined to be 5430 p.s.i.g.

DEMONSTRATION 4

In this demonstration substantially the same procedure was followed as in Demonstration 1. The permeability flush consisted of 300 cc. of a 10 percent toluene in diesel oil solution. Final permeability of a consolidated sand pack was 470 millidarcies or 22 percent of the initial permeability. Average compressive strength based on representative samples was determined to be 5590 p.s.i.g.

DEMONSTRATION 5

In this demonstration substantially the same procedure was followed as in Demonstration 1. The permeability flush consisted of 300 cc. diesel oil with no additive. The final permeability was found to be 380 millidarcies or 14 percent of the initial permeability. Average compressive strength based on representative samples was determined to be 4610 p.s.i.g.

Although several specific embodiments of the invention have been described in detail, the invention is not to be limited to only such embodiments but rather by the appended claims.

We claim:

1. A method of consolidating loose or unconsolidated earth formation penetrated by a borehole which comprises injecting into the formation adjacent the borehole separately and in sequence one volume of an epoxy compound or mixture of epoxy compounds; at least one-third volume of a hydrocarbon oil containing from 2.5 percent to 15 percent by volume of a hydrocarbon oil-miscible compound for obtaining permeability in the consolidated formation; and a quantity of a dilute solution of a resin curing agent for the epoxy compound sufficient to cause hardening of a major part of the epoxy compound injected into the formation.

2. A method of consolidating loose or unconsolidated earth formation penetrated by a borehole which comprises injecting into the formation adjacent the borehole separately and in sequence one volume of an epoxy compound or mixture of epoxy compounds; at least one-third volume of a hydrocarbon oil containing from 2.5 percent to 15 percent by volume of a hydrocarbon oil-miscible compound selected from the group consisting of lower alkanols and lower aliphatic ketones; and a quantity of a dilute solution of a resin curing agent for the epoxy compound sufficient to cause hardening of a major part of the epoxy compound injected into the formation.

3. A method of consolidating loose or unconsolidated earth formation penetrated by a borehole which comprises injecting into the formation adjacent the borehole separately and in sequence one volume of 100 parts by weight of a mixture of an epoxy compound or mixture of epoxy compounds, from 10 to 100 parts by weight of a predominantly aromatic hydrocarbon liquid and from 0.5 to 5 parts by weight of silane; at least one-third volume of a hydrocarbon oil containing from 2.5 percent to 15 percent by volume of a hydrocarbon oil-miscible compound selected from the group consisting of lower alkanols and lower aliphatic ketones; and a quantity of a dilute solution of a resin curing agent for the epoxy compound sufficient to cause hardening of a major part of the epoxy compound injected into the formation.

4. The method of consolidating loose or unconsolidated earth formation penetrated by a borehole which comprises injecting into the formation adjacent the borehole separately and in sequence
one volume of a mixture of
(a) 100 parts by weight of an epoxy compound or mixture of epoxy compounds having the formula:

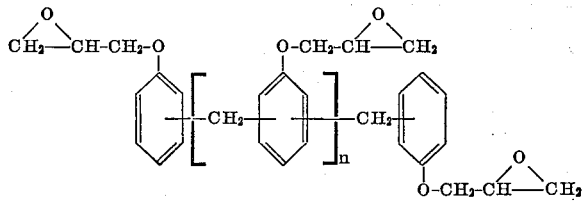

in which $n$ is an integer from 0 to 5,
(b) from 10 to 100 parts by weight of a predominantly aromatic hydrocarbon liquid, and
(c) from 0.5 to 5 parts by weight of a glycidyl oxyalkyl trialkoxysilane;

at least one-third volume of a hydrocarbon oil containing from 2.5 percent to 15 percent by volume of a hydrocarbon oil-miscible compound selected from the group consisting of lower alkanols and lower aliphatic ketones;

and a quantity of a dilute solution of a resin curing agent for the epoxy compound sufficient to cause hardening of a major part of the epoxy compound injected into the formation.

5. The method of claim 4 wherein the hydrocarbon oil-miscible compound is 2-propanol.

6. The method of claim 4 wherein the hydrocarbon oil-miscible compound is acetone.

References Cited

UNITED STATES PATENTS

| | | | |
|---|---|---|---|
| 3,100,527 | 8/1963 | Hilton et al. | 166—295 |
| 3,176,767 | 4/1965 | Brandt et al. | 166—295 |
| 3,176,768 | 4/1965 | Brandt et al. | 166—295 |
| 3,176,769 | 4/1965 | Treadway et al. | 166—295 |
| 3,250,330 | 5/1966 | Smith | 166—295 |
| 3,291,213 | 12/1966 | Bezemer et al. | 166—295 |
| 3,297,089 | 1/1967 | Spain | 166—295 |
| 3,310,111 | 3/1967 | Pavlich et al. | 166—295 |
| 3,316,966 | 5/1967 | Dear | 166—295 |

STEPHEN J. NOVOSAD, Primary Examiner

PO-1050
(5/69)

UNITED STATES PATENT OFFICE
CERTIFICATE OF CORRECTION

Patent No. 3,478,824            Dated November 18, 1969

Inventor(s) Patrick H. Hess and Ralph S. Millhone

It is certified that error appears in the above-identified patent and that said Letters Patent are hereby corrected as shown below:

Column 1, line 54 "permability" should be --permeability--

Column 2, formula, lines 8 and 50 "CH" should be --$CH_2$--

Columns 3 and 4, Table I, Column 2, line 5, "Toulene" should be --Toluene--

Columns 3 and 4, Table I, Column 7, line 10, "4,700" should be --2,700--

Column 4, line 53, after "triethylenetetramine," it should be --3-dimethylaminopropylamine, and 3-diethylaminopropylamin cyclic aliphatic amines,--

Column 4, line 59 "4,4'" should be --4.4'--

Column 5, line 68, "soltuion" should be --solution--

Column 6, lines 6 and 7, "3-glycidyloxypropyltrimethoxysilane" should be --3-glycidoxypropyltrimethoxysilane--

SIGNED AND
SEALED
SEP 15 1970

(SEAL)
Attest:

Edward M. Fletcher, Jr.
Attesting Officer

WILLIAM E. SCHUYLER, JR.
Commissioner of Patents